United States Patent [19]

Ziobro

[11] 4,407,015
[45] Sep. 27, 1983

[54] MULTIPLE EVENT DRIVEN MICRO-SEQUENCER

[75] Inventor: Daniel P. Ziobro, Downingtown, Pa.

[73] Assignee: Burroughs Corporation, Detroit, Mich.

[21] Appl. No.: 210,557

[22] Filed: Nov. 26, 1980

[51] Int. Cl.³ .............................................. G06F 9/16
[52] U.S. Cl. .................................................... 364/200
[58] Field of Search ............................... 364/200, 900

[56] References Cited

U.S. PATENT DOCUMENTS 3,798,614  3/1974  Meadows et al. ............... 364/200
3,939,455  2/1976  Toyosawa ........................ 364/200

OTHER PUBLICATIONS

Forbes et al., Afips Proceedings-Fall Joint Computer Conference, 1965-"A-Self-Diagnosable Computer" pp. 1073-1086.

Primary Examiner—Felix D. Gruber
Assistant Examiner—D. Rutherford
Attorney, Agent, or Firm—Mark T. Starr; Edmund M. Chung; K. R. Peterson

[57] ABSTRACT

A micro-sequencer allowing multiple decisions to be made in one instant of time is disclosed. A multiplexor array is employed to generate a multiple output condition code from inputted test conditions. The generated condition code is concatenated to a base pointer field of the currently executing microinstruction, and the result is used to address a next state table. The output of the next state table is the address of the microinstruction to be executed next if the then currently executing microinstruction specifies a jump operation.

11 Claims, 3 Drawing Figures

MULTIPLE EVENT DRIVEN MICRO-SEQUENCER

BACKGROUND OF THE INVENTION

Referring to the drawings, FIG. 1 shows a traditional micro-sequencer 10 which is capable of either jumping to a new point in the microcode or stepping to the next microinstruction.

The prior art micro-sequencer 10 is composed of three main logical elements. The condition code multiplexor 12 is used to test one or more states (or conditions) of the system it is utilized in. The condition code multiplexor selects which of its input conditions are to be tested in response to the multiplexor address control signals from the PROM Array 12. Thus, for example, three multiplexor address signals may be used to select one of eight condition inputs to the multiplexor 12, the output of multiplexor 12 providing one signal which is fed to the enable load input of PROM Address Register/Counter 14. If the enable load signal generated by the condition code multiplexor 12 is false, the register counter 14 will respond by incrementing its contents by some fixed value, one (1) being a typical increment value. If, on the other hand, the generated enable load signal is true, the register/counter 14 will parallel load a new value from the next address field of the PROM Array 16, the prom array 16 providing the storage to contain the associated system's microprogram. Although not shown, the prom array 16 is presumed to include the intelligence of the associated system. Thus, the prom array 16 may be just a simple memory, or it may be part of a microprocessor or other type of microprogrammed digital data processor, the design of such a data processor being well known to those skilled in the art.

The major drawback of the prior art micro-sequencer 10 of FIG. 1 is in the limited number of decisions which can be made over a given amount of time. Thus, the microprogram can either step to the next instruction or jump to a new point in the microcode. If multiple conditions capable of requiring multiple actions have to be tested, then multiple increments of time must be used in testing.

It is the general object of the present invention to eliminate these and other drawbacks of the prior art by providing an improved micro-sequencer.

It is another object of the present invention to provide a micro-sequencer capable of sampling multiple test conditions.

It is yet another object of the present invention to provide a micro-sequencer which allows multiple decisions to be made in one instant of time.

It is still another object of the present invention to provide a micro-sequencer which increases the speed of operation of its associated system.

It is yet another object of the present invention to provide a micro-sequencer which provides increased speed when making decisions requiring the testing of multiple conditions.

These and other objects, features and advantages of the present invention will become more apparent from the detailed description of the preferred embodiment when read in conjunction with the drawings.

SUMMARY OF THE INVENTION

According to the invention, a PROM address register/counter which may be parallel loaded or stepped in value, provides the address input to a PROM array used to store the microprograms for the system the present micro-sequencer is utilized in. The loading and incrementing of the register/counter is under control of the prom array.

A condition code multiplexor array accommodates multiple input test conditions and multiplexes these conditions into a multiple output condition code field. Each microinstruction stored in the prom array includes a field which points to an address in a next state table. This field acts as a base pointer to a group of addresses. The condition code multiplexor array, with its multiple output condition code, is controlled by the microprogram. The condition code, acting as an index, is concatenated with the base pointer field which is contained in the microinstruction currently being executed. The address generated by the concatenation is used to access a location in the next state table PROM. The output of the next state table prom is another address which specifies the location of a microinstruction in the prom array. If the microinstruction being executed specifies a load of the prom address register/counter, the address read out of the next state table prom will be stored in the address register/counter, thus specifying the address of the next microinstruction to be executed.

The indexing action of the condition codes allows multiple decisions to be made in one instant of time. Consequently, it is not necessary to step through several states to test several conditions, thereby increasing the speed of operation of the associated system.

DESCRIPTION OF THE PREFERRED EMBODIMENT

Figure 3:
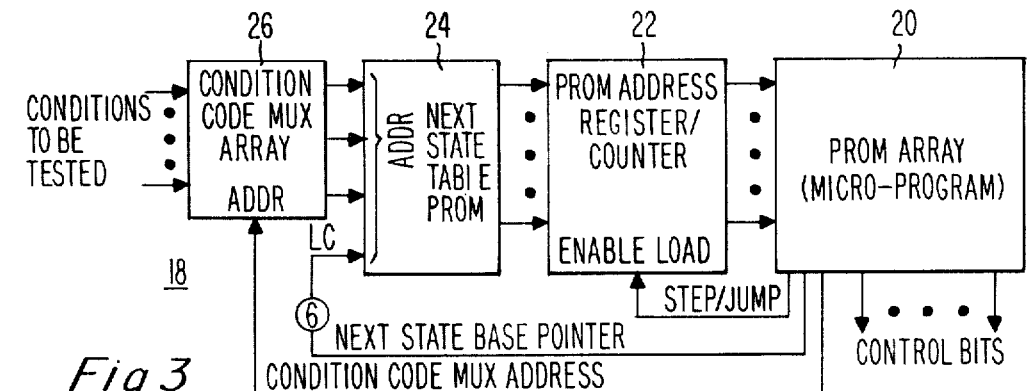
FIG. 3 is a functional block diagram illustrating the preferred embodiment of the micro-sequencer of FIG. 2.
Figure 2:
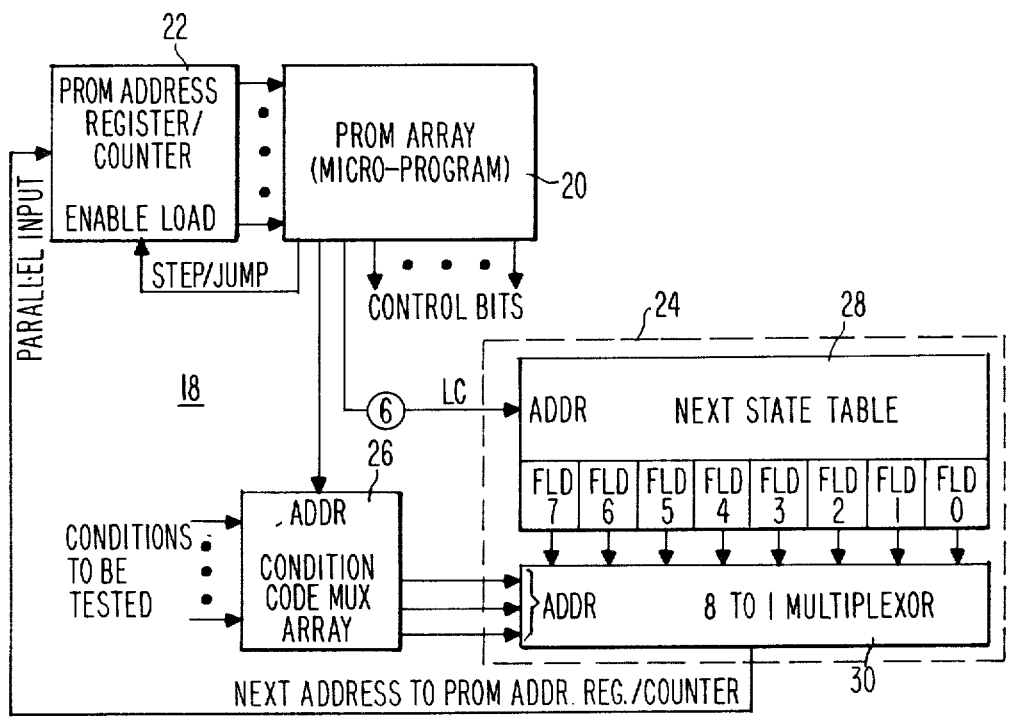
FIG. 2 is a functional block diagram showing the logical data flow in one embodiment of the multiple event driven micro-sequencer of the present invention.

Referring now to the drawings, FIG. 2 shows the logical data flow of one embodiment of the present invention, while FIG. 3 illustrates the hardware implementation of the preferred embodiment of the present invention. Identical reference numerals are utilized on both of these figures so that the reader may utilize both drawings together.

The PROM Array 20 containing the microcode serves the same purpose in the present invention as in the prior art sequencer 10; viz., it includes the intelligence of the associated system. As will be obvious to those skilled in the art, the control bits from the prom array 20 are used to control elements of the system the sequencer 18 is a part of, or some other structure, as well as to control the other elements in the sequencer 18. The contents of the PROM Array 20 will vary depending on the system type, the design of the required microprograms being obvious to those skilled in the art.

The PROM Address Register/Counter 22 also serves the same purpose in the present invention as in the prior art sequencer 10. In the preferred embodiment of the present invention, the register/counter 22 is made up of two chips which are configured to provide eight bits of storage which can be parallel loaded with an eight bit value or stepped up by the value one, depending on the signal provided to the enable load input. Thus, the state of the step/jump control bit output from the prom array 20 tells the register/counter 22 either to parallel load (from its parallel input) the full address or to step the current address by one. The address stored in the register/counter 22 points to a storage location in the prom array 20.

Before going into details of the construction and operation of the remaining elements of the present invention, a brief overview of the operation of the present invention may be helpful. Each location in the prom array 20 includes a field which points to a location in the next state table 24. This field acts as a base pointer to a group of addresses. The condition code multiplexor array 26, with its multiple outputs, is controlled by the microprogram stored in the prom array 20. The condition code outputted by the condition code multiplexor array 26 acts as an index which is concatenated to the base pointer read from the prom array 20 to determine the next state of the micro-sequencer 18. Thus, the indexing action of the condition codes allows multiple decisions to be made at one instant of time. Consequently, it is not necessary to step through several states to test several conditions.

Figure 1:
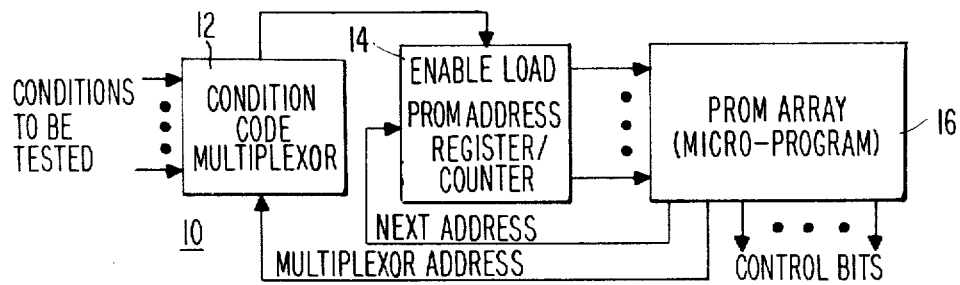
FIG. 1 is a functional block diagram of a prior art micro-sequencer.

In the prior art (FIG. 1), the condition code multiplexor array 12 was used to produce one signal from the input conditions to be tested and the state of the signal produced was used to determine whether to jump or to go to the next state. In the preferred embodiment of the present invention (FIGS. 2 and 3), the condition code multiplexor array 26 includes multiple multiplexors (not shown) arranged to perform as an array, whereby in response to an input address and the input test conditions, three condition code signals are produced at the output of the multiplexor array 26.

More particularly, in the preferred embodiment of the present invention the condition code array 26 employs three multiplexor chips in the multiplexor array 26, with each chip capable of accepting up to eight test conditions. The multiplex address input to the condition code array 26 comprises three control signals from prom array 20. The three multiplexor address signals inputted select one of the eight inputs to each of the three multiplexor chips to provide the three output condition code bits from the condition code multiplexor 26. Although in the preferred embodiment three bits are always produced at the output of the condition code multiplexor array 26, they are not always utilized in determining the next state. Thus, an output condition code bit may be considered a "don't care" if the next state table prom 24 contains identical addresses at the two locations specified by the two possible states that the "don't care" bit may assume.

Those skilled in the art will realize that the condition code multiplexor array 26 may be designed to include virtually unlimited intelligence and may accept any number of input test conditions, so long as multiple condition code bits are produced at the output and the pattern of the output condition code bits represent meaningful information.

As previously mentioned, a location code (LC) field in each microinstruction (stored in prom array 20) that is being executed acts as a base address to the next state table prom 24. The condition code bits output by the condition code multiplex array 26 are concatenated with the location code output from the prom array 20 to specify an address in the next state table prom 24. In the preferred embodiment, the next state table prom 24 contains 512 addressable locations and thus requires a nine bit address input. Also, in the preferred embodiment the location code is used for the six most significant address bits and the condition code multiplex array 26 output bits are used as the three least significant address bits. Alternatively (FIG. 2), the location code may point to a block of addresses and thus acts as a base address. The three condition code multiplex array 26 output bits do the multiplex function, thus acting as an index. Those skilled in the art will realize that the method of concatenation used in the preferred embodiment of the invention is only one of many ways of combining the location code (LC) and the condition code bits to form an effective address.

The description thus far given should be adequate to enable one of ordinary skill in the art to make and use the present invention utilizing standard, off the shelf components. The following provides exemplary components which may be used to implement the preferred embodiment of the invention. However, alternate components to implement the required functions will be obvious to one of ordinary skill in the art.

In the preferred embodiment, the program array 20 is formed from three commonly addressed type 93427 proms which each contain 256 4-bit storage locations, thereby providing a 256×12 bit storage array. In such case, in response to each of the three proms receiving the same 8-bit input address, twelve data bits are read out of the array. These twelve data bits are divided into four fields of information, namely a two bit control field, a six bit next state base pointer, a three bit condition code multiplexor address, and a one bit step/jump field. The choice of which bit positions in the prom array 20 are used to store which field will depend on the microprocessor being utilized and is unimportant to the practice of the present invention.

In the preferred embodiment, the condition code multiplexor array 26 is formed from three type 74151 8-to-1 bit multiplexor circuits. Each multiplexor circuit is capable of receiving eight separate input test conditions. All three multiplexor circuits receive the same 3 bit condition code multiplexor address from prom array 20 as their data select inputs. In response to the data and select inputs, each of the three multiplexor circuits produces a one bit output which together provides three bits of the nine bit address input to the next state table prom 24.

In the preferred embodiment, the next state table prom 24 is formed from two type 93446 512×4 bit proms which together form a 512×8 bit prom. Each of the two 512×4 bit proms receives the same nine bit address input, the six high order address input bits being the next state base pointer from prom array 20 and the three low order address input bits being the three bits output from the condition code multiplex array 26.

In the preferred embodiment, the four bits output from each of the two 512×4 bit proms in the next state table prom 24 are connected as respective inputs to each of two type 74161 4 bit counters with parallel load, these counters forming the prom address register/counter 22. Each of these counters receives a common load signal from the step/jump output field of prom array 20. The combined eight bit output from the two counters provides the eight address bit input to each of the three 256×4 bit proms in the prom array 20.

FIG. 2 illustrates the alternate manner in which the next state table 28 may be implemented. However, those skilled in the art will realize that the next state table prom 24 is merely a memory that may be implemented in many ways, including implementation as a PROM as in the preferred embodiment. In the alternate embodiment of the invention, eight new address bits are read out at the output of the 8-to-1 multiplexor 30 in response to the concatenated nine bit address that was input to the next state table prom 24. The eight new address bits are stored in the address register/counter 22 if the step/jump control bit specifies a jump operation. In such case, the address stored in the register/counter 22 normally specifies the address of the next instruction in the prom array 20 to be executed by the associated system. On the other hand, if a step operation is specified by the step/jump control bit sent from prom array 20, then instead of being loaded with the output of the next state table prom 24, the contents of the register/counter 22 is just stepped by one.

In summary then, the location code read from the prom array 20 says that the associated system is in a certain area of the microcode and is going to make a decision as to where specifically in that section of microcode it should be, the decision based on the conditions input to the condition code multiplexor array 26.

As to whether the system will jump to the address read from the next state table prom 24 or simply step to the next sequential microinstruction, the logic and microprogramming involved in making such a decision will vary with the system type being utilized, and will be apparant to the system's microprogrammer.

Having shown and described the preferred embodiment of the present invention, those skilled in the art will realize that various omissions, substitutions and changes in forms and details may be made without departing from the spirit of the invention. It is the intention, therefore, to be limited only as indicated by the scope of the following claims.

What is claimed is:

1. A multiple event driven micro-sequencer for use in a microprogram controlled system, said microprogram controlled system including an addressable storage for storing microinstructions, said microprogram controlled system capable of activating selected control signals in response to executing said microintructions, said multiple event driven micro-sequencer comprising:
   register-counter means, coupled to said addressable storage, said register-counter means for storing the address of the addressable storage location to be accessed;
   means for generating a condition code, said condition code generating means responsive to a plurality of inputted test conditions; and
   next state means, responsive to said generated condition code and said microprogram controlled system, said next state means for providing said register-counter means with an entire next state address.

2. The multiple event driven micro-sequencer in accordance with claim 1 wherein said next state means includes an addressable next state memory, said addressable next state memory responsive to an address formed by concatenating said generated condition code with a base address.

3. The multiple event driven micro-sequencer in accordance with claim 2 wherein said base address includes a field of information from the last one of said microinstructions read from said addressable storage.

4. The multiple event driven micro-sequencer in accordance with claim 2 or 3 wherein said concatenated address includes a number of high order bit positions and a number of low order bit positions, said concatenated address formed using said base address as said number of the high order bit positions and said generated condition code as said number of the low order bit positions.

5. The multiple event driven micro-sequencer in accordance with claim 2 wherein said register-counter means includes next state storage means, responsive to a jump control signal from said microprogram controlled system, said next state storage means for storing the entire next state address provided by said addressable next state memory.

6. The multiple event driven micro-sequencer in accordance with claim 5 wherein said register-counter means further includes incrementing means, responsive to a step control signal from said microprogram controlled system, said incrementing means for incrementing the contents of said register-counter means by a fixed increment.

7. The multiple event driven micro-sequencer in accordance with claim 1 or 2 wherein said generated condition code is at least two bit positions in length.

8. The multiple event driven micro-sequencer in accordance with claim 1 or 2 wherein said condition code generating means includes a plurality of multiplexor circuits, each one of said multiplexor circuits including inputs for accepting a subset of said plurality of inputted test conditions and an output.

9. The multi event driven micro-sequencer in accordance with claim 8 wherein said generated condition code is formed by combining the output of each one of said plurality of multiplexor circuits, the output of each one of said multiplexor circuits responsive to a condition code multiplex address from said microprogram controlled system.

10. The multiple event driven micro-sequencer in accordance with claim 2 wherein said addressable next state memory, in response to an access to said concatenated address, produces at its input said entire next state address.

11. The multiple event driven micro-sequencer in accordance with claim 1 wherein said next state means includes:
   a plurality of addressable next state memories, each of said plurality of addressable next state memories responsive to a common base address; and
   a multiplexor circuit having inputs for simultaneously receiving the outputs from each of said plurality of addressable next state memories, said multiplexor circuit responsive to said generated condition code to select the output of one of said plurality of addressable next state memories.

* * * * *